United States Patent [19]
Goldenberg et al.

[11] Patent Number: 6,113,343
[45] Date of Patent: Sep. 5, 2000

[54] EXPLOSIVES DISPOSAL ROBOT

[76] Inventors: Andrew Goldenberg; Nenad Kircanski, both of 5 King's College Road, Toronto, Ontario, Canada, M5S 3G8; Sheldon K. Dickie, Box 109-C, R.R. #1, Hammond, Ontario, Canada, K0A 2A0; Gordon D. Scott, 6181 Voyageur Drive, Gloucester, Ontario, Canada, K1C 2X5; Lawrence Gryniewski, 5 King's College Road, Toronto, Ontario, Canada, M5S 3G8

[21] Appl. No.: 09/009,732

[22] Filed: Jan. 21, 1998

Related U.S. Application Data

[63] Continuation-in-part of application No. 08/767,427, Dec. 16, 1996, abandoned.

[51] Int. Cl.$^7$ ..................................................... B66C 1/00
[52] U.S. Cl. ................................. 414/729; 901/1; 901/28; 901/43; 239/587.2; 305/127; 305/185
[58] Field of Search ..................................... 414/680, 729; 901/28, 43, 1; 305/15, 157, 165, 185, 127, 128, 193; 180/6.2; 294/902; 239/227, 587.2, 587.5, 587.6

[56] References Cited

U.S. PATENT DOCUMENTS

| | | |
|---|---|---|
| 3,788,412 | 1/1974 | Vincent .............................. 305/128 X |
| 3,948,093 | 4/1976 | Folchi et al. ......................... 901/29 X |
| 4,199,294 | 4/1980 | Sreck et al. . |
| 4,200,922 | 4/1980 | Hagemann . |
| 4,229,136 | 10/1980 | Panissidi ............................. 901/29 X |
| 4,274,502 | 6/1981 | Somerton-Rayner ................ 180/6.2 |
| 4,488,241 | 12/1984 | Hutchins et al. . |
| 4,570,530 | 2/1986 | Armstrong . |
| 4,620,362 | 11/1986 | Reynolds . |
| 4,621,562 | 11/1986 | Carr et al. . |
| 4,652,204 | 3/1987 | Arnett . |
| 4,697,838 | 10/1987 | Hartman . |
| 4,699,414 | 10/1987 | Jones ................................. 294/902 X |
| 4,709,265 | 11/1987 | Silverman et al. . |
| 4,753,473 | 6/1988 | Arnett . |
| 4,773,298 | 9/1988 | Tischer et al. . |
| 4,865,514 | 9/1989 | Tsuchihashi et al. . |
| 4,932,831 | 6/1990 | White et al. . |

(List continued on next page.)

FOREIGN PATENT DOCUMENTS 0270237   6/1988   European Pat. Off. ............. 305/15 X

*Primary Examiner*—Donald W. Underwood
*Attorney, Agent, or Firm*—MacRae & Co.

[57] ABSTRACT

A robot especially adapted for use in hazardous environments, and particularly adapted for explosives disposal, includes a wheeled platform carrying a winder mechanism which ensures that the remote control cable will not be fouled by the robot or its attachments. Coaxial with the winder mechanism is a turret mechanism that can rotate indefinitely and which carries thereon a manipulator arm section which, includes a first arm pivotable through about 110° and which carries thereon a second arm which is pivotable through about 120° and carries a bulkhead to which any of a plurality of end effectors can be connected by way of a quick connect and disconnect mechanism. The end effectors include a set of links having different lengths, one or two extension links, a wrist and gripper mechanism, an aiming and disruptor mechanism, and a relocatable surveillance camera. The robot is capable of controlled movement to or from a hazardous site; manoeuvring the wrist and gripper mechanism or the aiming and disruptor mechanism, by means of the manipulator arm, into close proximity with, to either move or destroy, a target. Rugged, zero-backlash joints blend precision and power for the end effectors to perform delicate, or not so delicate, operations. The wrist and gripper mechanism in combination with any or all of the extension links allows dextrous operations to be performed easily, even for an untrained operator. The robot is compact, highly manoeuvrable, relatively inexpensive, and meets the requirements of law enforcement, military and environmental agencies having a need for such a device.

20 Claims, 13 Drawing Sheets

U.S. PATENT DOCUMENTS

| | | |
|---|---|---|
| 4,984,745 | 1/1991 | Akeel et al. . |
| 4,993,912 | 2/1991 | King et al. . |
| 5,237,468 | 8/1993 | Ellis . |
| 5,286,973 | 2/1994 | Westrom et al. . |
| 5,314,425 | 5/1994 | Shpigel ................................ 901/28 X |
| 5,377,913 | 1/1995 | Van Der Woude ................... 901/43 X |
| 5,416,321 | 5/1995 | Sebastian et al. . |
| 5,421,218 | 6/1995 | Akeel et al. . |
| 5,440,916 | 8/1995 | Stone et al. . |
| 5,443,354 | 8/1995 | Stone et al. . |
| 5,561,883 | 10/1996 | Landry et al. . |
| 5,570,992 | 11/1996 | Lemelson ................................ 901/1 X |
| 5,647,554 | 7/1997 | Ikegami et al. ......................... 901/1 X |

EXPLOSIVES DISPOSAL ROBOT

This is a continuation-in-part of commonly owned U.S. patent application Ser. No. 08/767,427 filed Dec. 16, 1996, now abandoned.

The present invention relates in general to a robot and in particular to a mobile robot especially adapted for service in hostile environments and for use in explosives disposal.

BACKGROUND OF THE INVENTION

Self-propelled and remotely operable robots which are especially adapted for operation in hazardous environments such as those involving explosives are known and are commercially available. Typically such robots include a wheeled or tracked platform which carries the operational components or attachments adapted for dealing with particular hazardous conditions. Available robots are designed to lift a payload at the end of an elongated arm and hence must be counterbalanced to avoid tipping over when such weights are elevated. For example, a robot might be used to lift a suspected explosive device and to place it in a hardened container where it could be exploded without harming the operating personnel in the vicinity. Available robots also have to be capable of operating over uneven terrain, and within the confines of buildings, and should be capable of climbing or descending stairs if necessary.

Two examples of robots especially adapted to explosives disposal are found in U.S. Pat. Nos. 4,621,562 of Nov. 11, 1986 to Carr et al, and 5,440,916 of Aug. 15, 1995 to Stone et al. Both of these patents disclose self-propelled robots, the former being wheel driven only, while the latter has a very complex track-laying drive arrangement. These robots have proven to be useful but they do have their shortcomings, whether in the area of manoeuvrability, versatility, size, speed, cost or control. There is a need for a relatively inexpensive robot that has considerable manoeuvrability, that can be readily adapted to perform a variety of tasks, that can move its gripping mechanism or its disposal and disruption equipment to almost any position relative to the robot's base, and that is easily controlled both indoors and outdoors and within confining spaces.

SUMMARY OF THE INVENTION

The present invention provides an improved modular reconfigurable robot especially adapted to: operate in almost any environment, whether outdoors or within confined spaces such as an industrial building or a dwelling; bring a variety of modular effectors to an operation site; enable easy interchange of modular effectors and their mounting means, including a unique disruptor aiming and firing mechanism; perform various dextrous operations such as opening door locks and vehicle doors; move in any direction in an easily controllable manner due to the optimized two-speed transmission; rotate the mounting section for the effectors through any angle relative to the base section of the robot, including angles greater than 360° (infinite rotation); and avoid any fouling of the control cable by the robot during operation of the robot.

The robot of the present invention includes a mobile base section which contains two drive servomotors, two transmissions, and storage batteries for powering the motors. A set of three wheels on each side of the robot provides support and forward and backward movement, with one wheel on each side being directly driven and the other wheels being indirectly driven from the driving wheel. Steering is achieved by differential operation of the drive on each side of the base section. The wheels are also adapted to mount one set of a pair of sets of removable tracks for operation over rough terrain or within buildings where it is necessary to climb or descend stairs. One set of tracks is wider than the other, the narrower set being of a size such that when mounted to the robot the maximum width is still less than that of a standard doorway. The wider set is used primarily to traverse muddy terrain or snow.

The base section mounts a cable winding and payout mechanism which permits about 250 m of coaxial control cable or about 500 m of fiber optic control cable to be wound thereon. The winding and payout mechanism includes a rotatable spool on which the cable is wound, holding it always at a distance from the robot to avoid fouling with the tracks, wheels, or other parts of the robot.

Inside the base section with a portion protruding above the winder section is a turret mechanism that is freely rotatable through angles greater than 360°, i.e. it is capable of infinite rotation, and which mounts a manipulator arm for rotation therewith. The manipulator arm includes a first arm portion that can move vertically through an arc of about 110° as operated by a set of linear actuators, and a second arm pivotally mounted adjacent the distal end of the first arm and operable via linear actuators through an arc of about 120°. The second arm carries a bulkhead to which can be interchangeably connected one or more attachments selected from of a plurality of fixed length links, one or more extendable links, a wrist and gripper mechanism, and an aiming and disruptor mechanism. The bulkhead and each of the attachments includes a quick connect and disconnect mechanism which includes both mechanical portions and electrical portions, the latter to enable connection between the electronic control for the robot and the item to be controlled thereby, i.e. the extendable link, the wrist and gripper mechanism, the aiming and disrupter mechanism, and any peripheral attachments such as video cameras, lights, and heaters associated therewith. The robot will also have a relocatable surveillance camera with yaw, pitch, zoom, and focus capabilities.

The robot of the present invention will be capable of operating in severe weather and environmental conditions. It is versatile and highly manoeuvrable and can find use as a police explosives disposal robot, as a police tactical squad support robot, as a military explosive disposal robot, as a platform for robotic research and development, as a hazardous material sampling and handling robot, and as a fire fighting assistance tool for fire departments. This is the only truly modular robot developed for hazardous environments. The operator can interchange the effector components or the drive components as desired depending on the particular situation facing the operator and the equipment. Thus, the robot can be tailored on site to perform those tasks presented to it without having to waste time and effort in configuring another, less-adaptable, robot for the task at hand.

In one form, the present invention may be considered as providing a robot especially adapted to handle hazardous material comprising: a) a wheeled base section containing power means for the robot, the base section having a planar upper surface; b) a winding and payout mechanism rotatably mounted to the base section, the winding and payout mechanism containing a length of cable, being freely rotatable through more than 360° and including means for holding the cable at a distance from the base section; c) a turret mechanism coaxial with the winding and payout mechanism and including a rotatable portion above the winding and payout mechanism; d) manipulator arm means mounted to the rotatable portion of the turret mechanism, the arm means including a base portion, a first arm pivotable at a proximal end thereof to the base portion, and a second arm pivotable between a proximal end thereof and a distal end thereof to the first arm adjacent a distal end thereof; e) quick connect and disconnect means at the distal end of the second arm means and adapted to accept one or more of a plurality of attachments especially adapted to perform a variety of functions; f) the plurality of attachments including a plurality of link sections of different lengths, telescopic extension link means, a wrist and gripper mechanism, and an aiming and disrupter mechanism; g) the wrist and gripper mechanism being movable in yaw, pitch and roll and including at least a pair of openable and closable gripper jaws, the wrist and gripper mechanism also being selectively connectable to a distal end of any one of the link sections and to a distal end of the telescopic link; h) control means for selectively controlling the movement of the base section, the rotatable turret portion, the manipulator arm means, and the attachments; and i) surveillance camera mechanism including yaw, pitch, zoom, and focus capabilities.

DESCRIPTION OF THE PREFERRED EMBODIMENT

Figure 1:
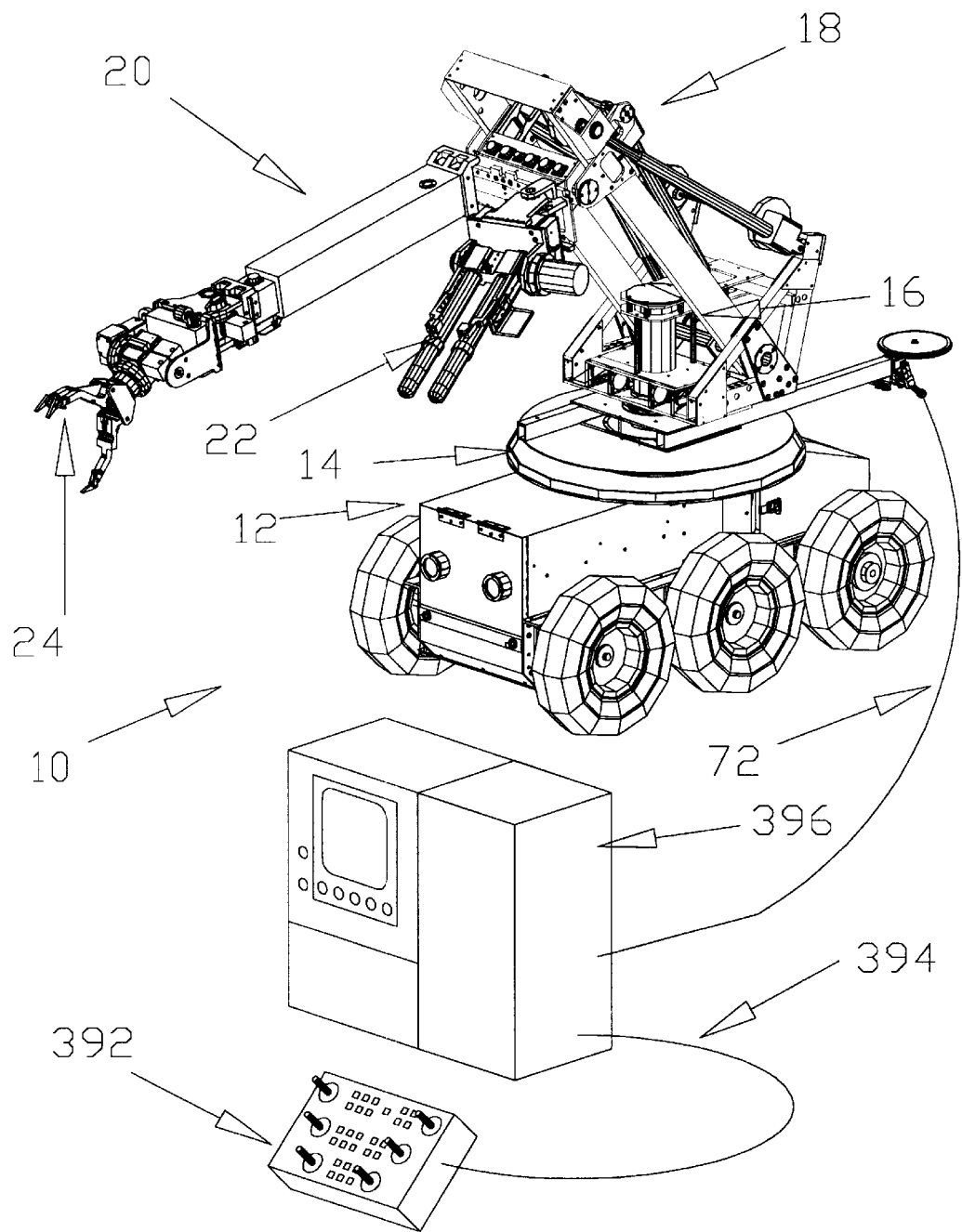
FIG. 1 is a perspective view of the robot of this invention showing the major features thereof.

FIG. 1 of the drawings illustrates the robot 10 of the present invention with certain components connected thereto. The robot 10 is seen to include a wheeled base section or platform 12, a cable winder mechanism 14 atop the base section, a turret mechanism 16 concentric with the winder mechanism with its output shaft protruding above the winder mechanism, manipulator arm means 18 mounted to the turret mechanism, an extendable link 20 connected to the manipulator arm means, an aiming and disrupter mechanism 22 connected to the manipulator arm means, and a wrist and gripper mechanism 24 connected to the distal end of the extendable link 20. Each of these components, and others, will be described in greater detail hereinafter.

Figure 2:
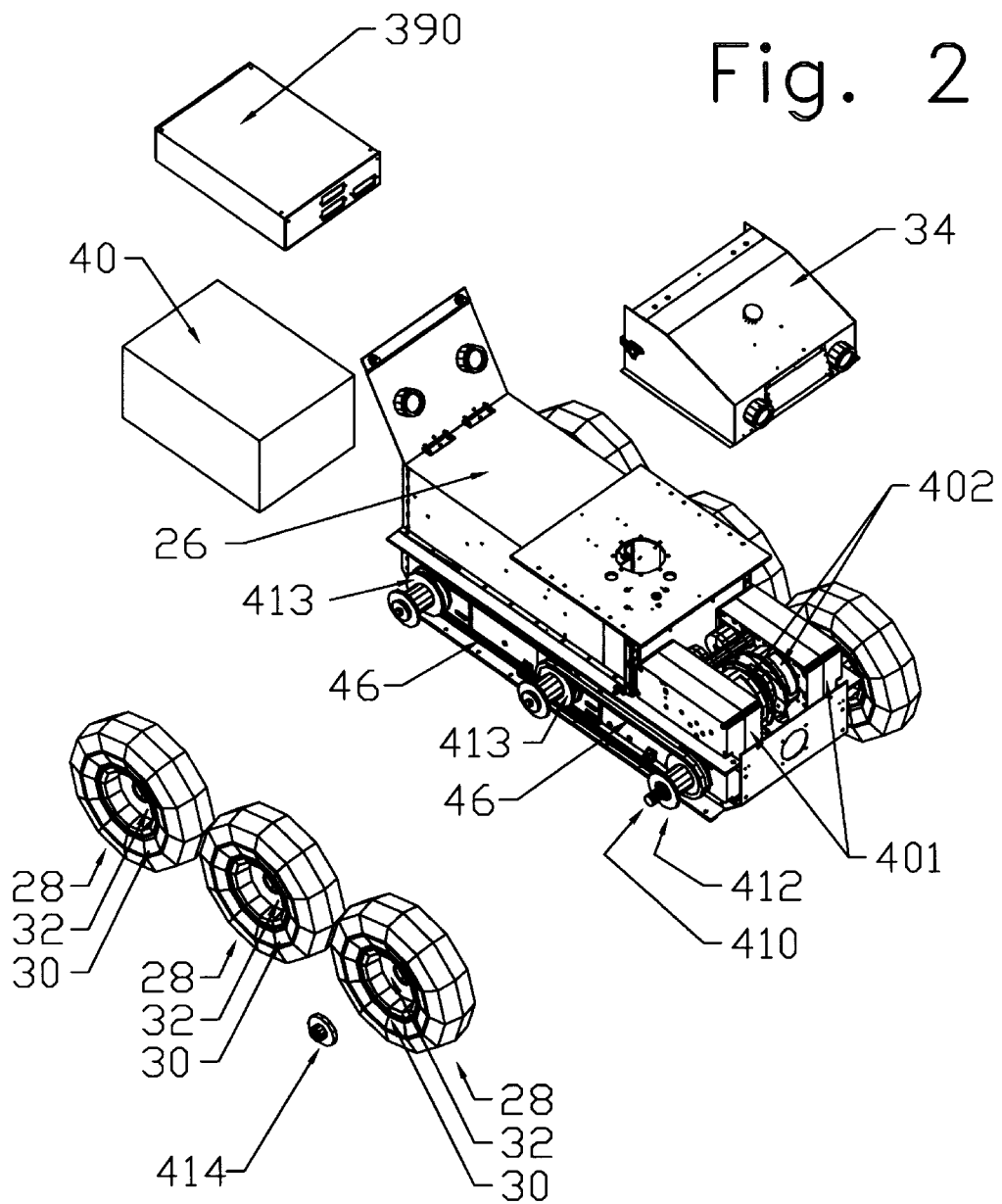
FIG. 2 is an exploded view of the base section.

The base section or platform 12 is shown in FIG. 2 as a generally boxlike member 26 having a plurality, such as three, of rubber-tired wheels 28 arranged along each side thereof. Preferably the tires 30 are mounted to multi-piece rims 32 which in turn are each mounted to an axle bearingly supported by the boxlike member 26. Each of the rear axles 410 is preferably drivingly connected to a corresponding one of two transmissions 401 contained within the boxlike member 26, as are drive motors 402 and a set of batteries, preferably four 12 volt batteries combined into a 48 volt battery pack 40, which provide power for the motors 402 and a control module 390 which provides the control of the robot. The battery pack and control module are housed within the boxlike member 26. The batteries and drive motors are shown schematically as they do not specifically form a part of the present invention and can be obtained commercially. A rear cover 34 fits on the boxlike member 26 to enclose the rear portion of the base section 12.

Figure 3:
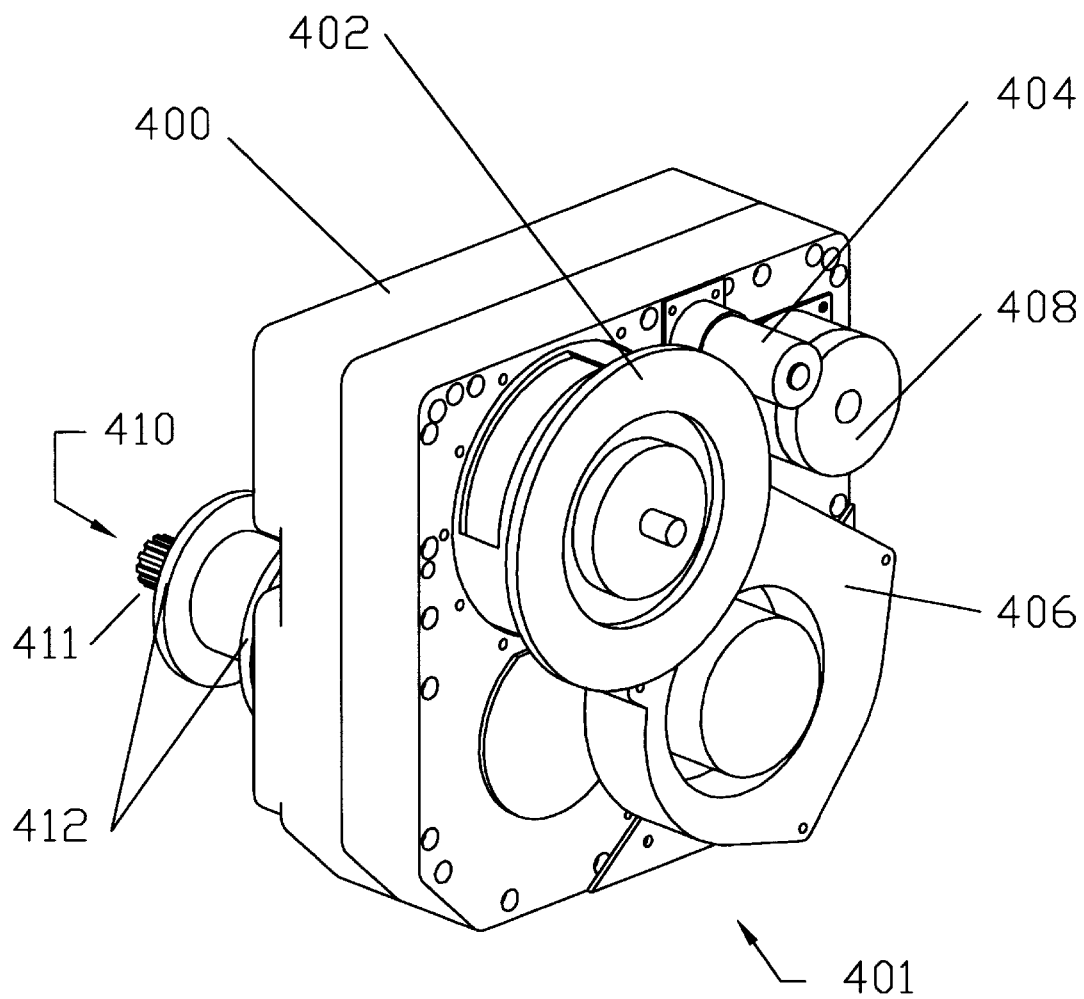
FIG. 3 is a perspective view of the two speed gearbox and transmission.

A two-speed transmission 401 is shown in FIG. 3. Each two-speed transmission 401 includes 15 spur gears (not shown), a custom designed gear box 400 mounting the spur gears, the drive motor 402, a gear-switching motor 404, a cooling fan 406, a brake 408, a splined output shaft 410, and at least one sprocket 412 bearingly mounted on the output shaft. The cooling fan 406 blows air across the motor 402 to cool it, thereby allowing the motor to achieve a power rating substantially higher, approximately 2.5 times higher, than a motor without cooling. The motor 402 is drivingly connected to two gear trains and the gear-switching motor 404 controls which gear train engages the output shaft 410. The brake 408 is connected to the gear train, and it allows the robot to be held stationary when desired by the operator, or when required for switching gears. The output shaft 410 includes a spline 411 at its end which meshes with a drive-spline 414 at a corresponding rear wheel 28. When the drive-splines are engaged, the power from the output shaft 410 is transmitted to the rear wheels of the robot, thereby driving the robot, and when the drive-splines are disengaged, the robot is in free-wheel mode, which allows the robot to be pushed and manoeuvred easily by the operator in the event of a malfunction. The two speeds for the transmission allow for superior robot capabilities, such as, in low-speed: extremely precise control of the robot for delicate operations; enormous pushing power capable of moving a parked car forwards, backwards, or sideways; and sufficient climbing power to carry the robot plus a substantial payload up a 45° slope or set of stairs, assuming that stability can be maintained; and in high-speed: fast driving speed to reach the target site quickly so that precious time is not wasted.

Each rear drive axle 410, preferably, includes a pair of the drive sprockets 412 and each of the front and center wheel axles carries a driven sprocket 413 similar to the drive sprocket 412. A drive chain 46 extends from and around each of the drive sprockets 412 to the respective front and center driven sprockets 413 so that both the front and center wheels on each side of the boxlike member 26 are driven by the rear drive wheels. The transmissions are set up to drive the axles 410 independently of each other so that steering of the robot is achieved by differentially driving the wheels on each side of the boxlike member.

Figure 4:
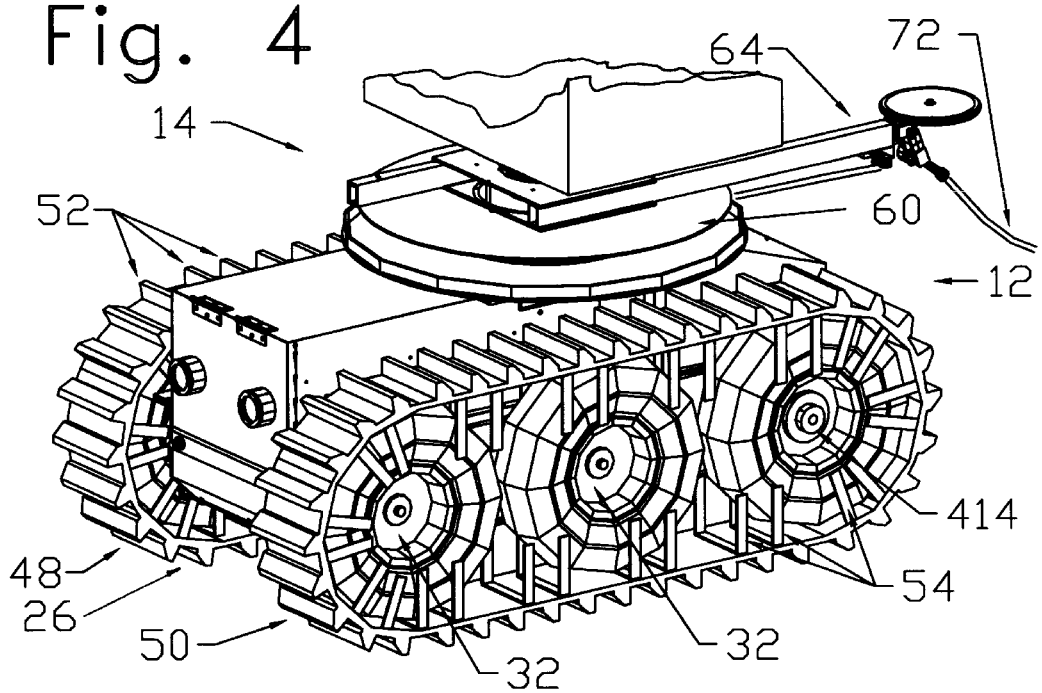
FIG. 4 is a perspective view of a wheeled base section with the winder mechanism mounted showing the use of two different widths of track.

As seen in FIG. 4 two sets 48, 50 of tracks are provided for optional fitment to the wheel sets on each side of the robot. The first set 48 (shown on one side of the base section) is narrow, so that with a pair of such tracks mounted to the wheels the robot can still pass through a narrow standard door opening of 28 inches (71 cm), while the second set 50 (shown on the other side of the base section) is wider, provides additional traction, but still allows the robot to pass through a wider standard door opening of 32 inches (81 cm). The tracks 48, 50 are conventional in construction, including a plurality of adjacent rubber cleated track members 52, a plurality of guide members 54 individually mounted to appropriate ones of the track members for cooperating fitment over the tires 30, means (not shown) flexibly connecting the track members together, and connection means (not shown) for connecting the two free ends of the track together once they have been extended around the wheel sets. The tracks improve the performance of the robot over uneven terrain, especially when there are obstacles to be overcome in the path of travel. The tracks also enable the robot to climb or descend stairs at up to about a 45 degree angle. The wider tracks help to improve performance in muddy or snowy conditions.

Figure 5:
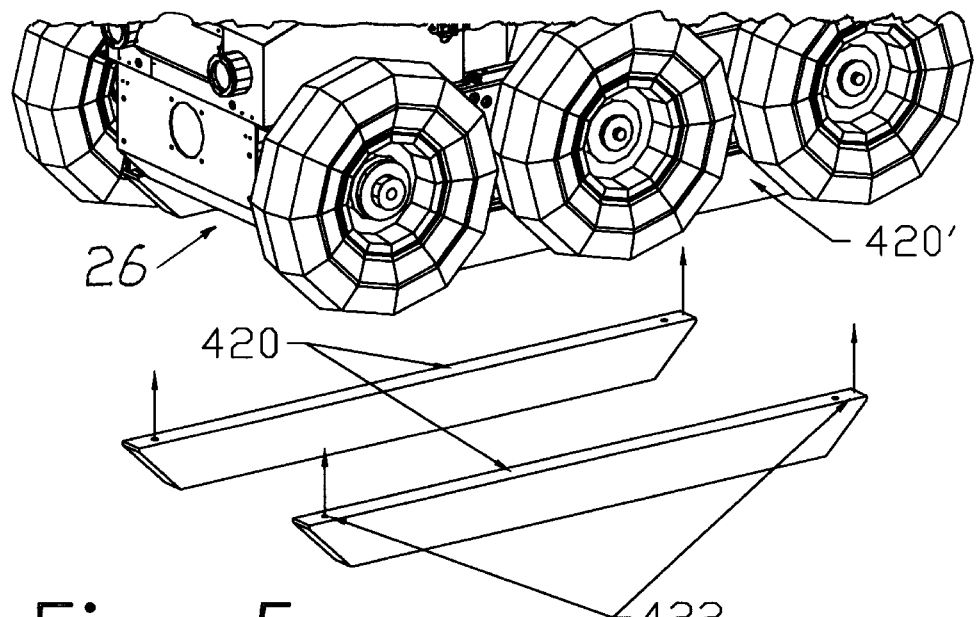
FIG. 5 is a perspective view showing the skids and their placement relative to the robot base section.

FIG. 5 shows a pair of skids 420 that are provided for optional fitment to the bottom surface of the base section at each side thereof The skids 420, which are removable and are an enhancement to the track system previously described, attach to the base section with wing screws at points 422, and they interface with the tracks 48 and 50 in such a way as to provide an approximately linear driving surface for the tracks which enhance the stair climbing capability of the robot. The skids 420 are also shown in their mounted position 420'.

Figure 6:
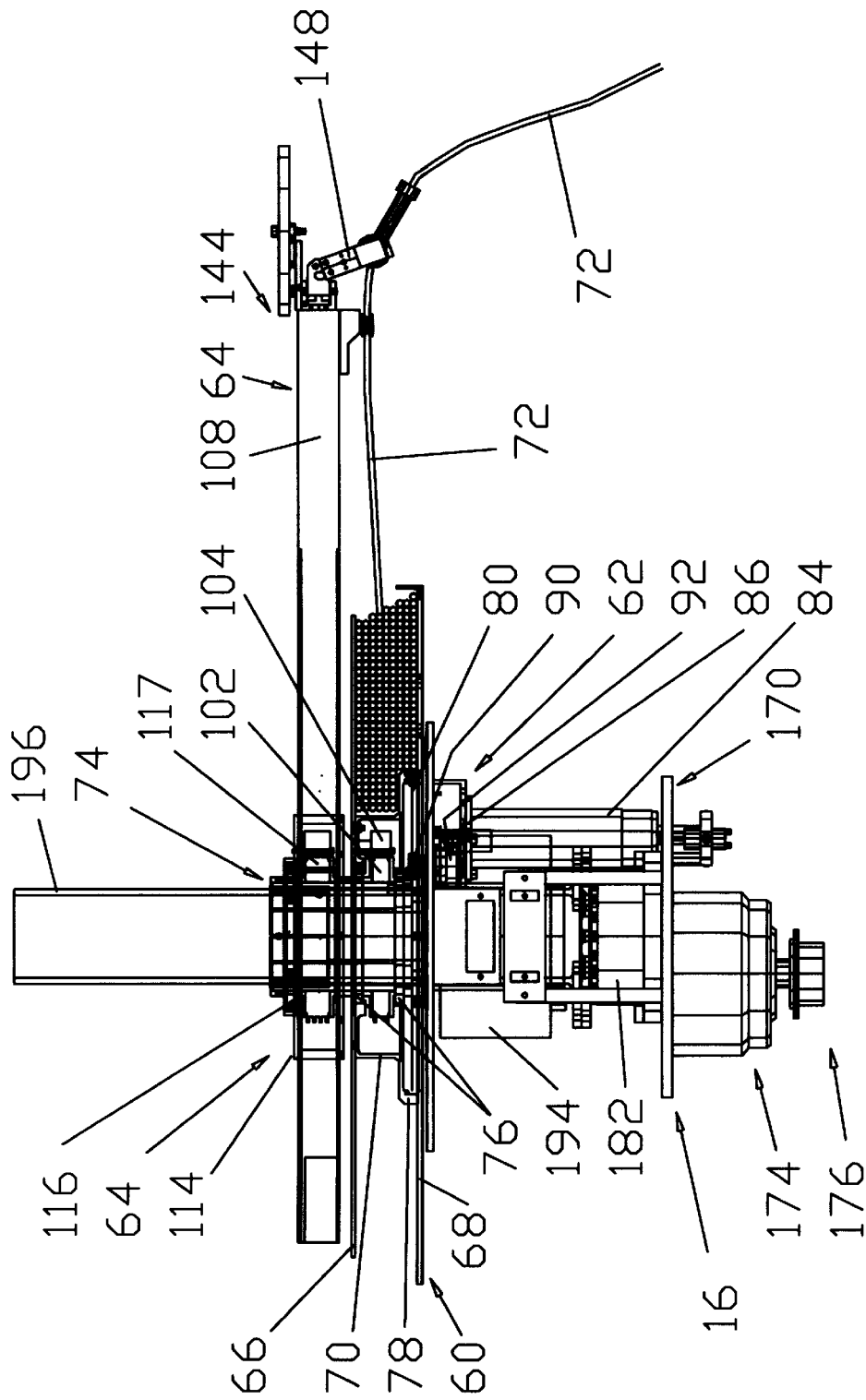
FIG. 6 is an elevational view of the winding and payout mechanism and the turret mechanism utilized with the present invention.
Figure 7:
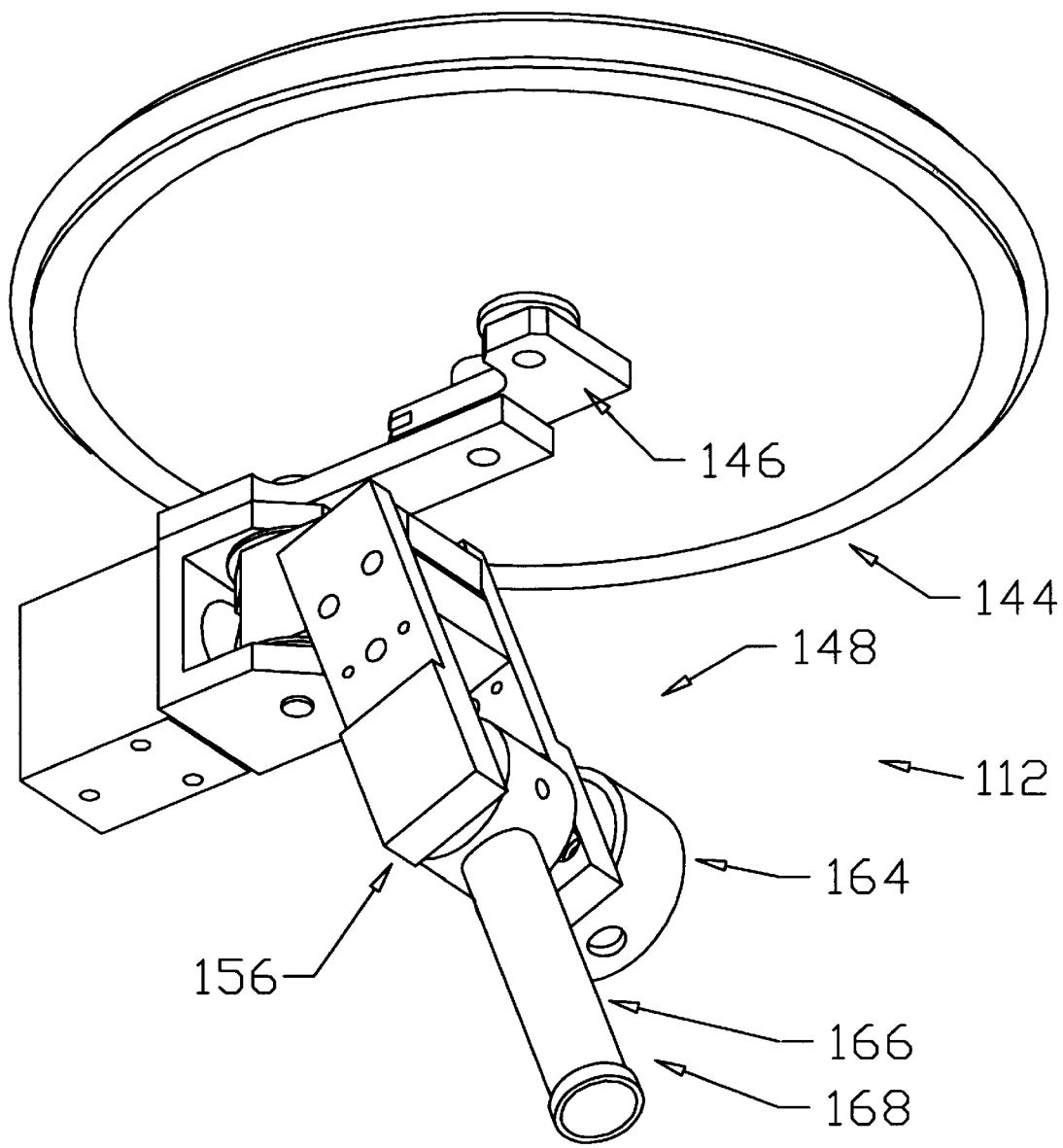
FIG. 7 is a perspective view of a cable tensiometer mechanism of the cable winder mechanism utilized with the present invention.

FIGS. 4, 6 and 7 show details of the cable winding and payout mechanism 14 of the present invention, which mechanism is positioned above the base section 12 on the upper surface of the boxlike member 26. The mechanism consists of three subsystems, the cable spool 60, the spool drive assembly 62, and the cable guide assembly 64.

The spool 60 is annular, with upper and lower annular flanges 66, 68 and an annular hub 70. The spool 60 is intended to hold up to 250 m of a coaxial control cable 72 (shown in FIG. 1) or up to 500 m of a fiber optic cable (not shown). The spool 60 fits concentrically on an annular tube 74 fixed to the base section 12 (FIG. 4) and is rotatably mounted thereon by way of a conventional bearing arrangement 76.

The lower flange 68 is connected to support plate or housing 78 which mounts, as part of the drive assembly 62, an internal circumferential plastic spur gear rack 80 thereon. A drive motor 84, powered by the battery pack 40, is positioned within the base section 12 and is drivingly connected to a spur gear 86 which meshes with spur gear 92 which in turn is connected via a shaft to a spur gear 90 which meshes with plastic spur gear rack 80. Therefore, as the motor 84 drives the gear 86 in one direction the gear 80 will be driven in the same direction so as to rotate the spool 60 on the bearing arrangement 76. In the preferred embodiment the spur gear 86 will have a pitch diameter of about 1.5 cm, the spur gear 90 will have a pitch diameter of about 2.4 cm, the spur gear 92 will have a pitch diameter of about 4.5 cm, and the internal spur gear 80 will have a pitch diameter of about 28.5 cm.

Located between upper and lower bearings of the bearing arrangement 76 is a slip ring assembly 100 which has stationary and rotating portions 102 and 104 respectively fixed to the annular tube 74 and to the inner surface of the hub 70. One end of the cable 72 is connected to the rotating portion 104 of the slip ring assembly, while the stationary portion 102 of the slip ring assembly is connected by a cable to the control electronics of the robot. By using the slip ring assembly 100 there is a continuous signal connection between the cable 72 and the robot during winding or payout of the cable and, of course, while the robot is stationary. Preferably the slip ring assembly will include both electrical and fiber optic slip ring sections for connection to the appropriate type of cable 72 being used.

The cable guide assembly 64 is used to control the manner in which the control cable 72 is wound onto the spool 60 and payed out therefrom. It is intended to permit the robot to travel around any obstacle without snagging, dragging, or breaking the control cable. It will continuously control the tension within the cable and the position thereof to ensure that the cable is not caught in the tracks, wheels or platform of the robot, regardless of the direction of travel. The cable guide assembly includes an arm member 108, a cable guide mechanism (not shown), and a tension controller 112 (FIG. 7).

The arm member 108 extends generally tangentially from above the upper flange 66 of the spool 60. At its proximal end it is connected to a plate 114 which is mounted to the annular tube 74 as by bearing assemblies 116. A slip ring assembly 117 between the plate 114 and the annular tube permits electrical power and electrical control signals to pass from the inner slip ring portion to the outer slip ring portion, allowing feedback from the tensiometer assembly 148, discussed below, to reach the controls for the winding system which are located in the control module 390.

As seen in FIG. 7, the distal end of the arm member 108 includes a surrounding bumper wheel 144 mounted to the arm member by bracket 146 and, within the periphery of the bumper wheel, a tensiometer assembly 148. Two pulleys (not shown) ensure a straight line path to the outer portion of the tensiometer. A depending housing 156 contains bearings which journal a shaft (not shown). At an inner end of the shaft is a commercially available potentiometer within a housing 164, while at the other end of the shaft an arm 166 is secured, the arm extending downwardly and outwardly from the shaft. A pair of bushings 168 are spaced apart along the arm, the bushings being adapted to receive the cable therethrough. The arm 166 provides a predetermined and adjustable tension to the cable as it passes through the bushings 168 and past the pulleys so that the cable will be wound on the spool 60 with a desired tension and also so that the cable will descend to the ground under its own weight at a desired distance away from the robot as the robot travels away from the operator. As the robot returns towards the operator the cable will be guided upwardly to the level of the arm member 108 at a distance well away from the robot so that it will not be run over by the robot or become entangled in the wheels or the tracks thereof.

FIG. 6 also shows the turret mechanism 16, which mechanism carries the manipulator arm 18 and is adapted for unlimited rotational movement relative to the base section or platform 12. It will be seen that the turret mechanism 16 includes a base 170 which is bolted to the base section 12, a motor-gearhead combination 174 (powered by battery pack 40), brake 176, a harmonic drive 182 which is drivingly connected to the output shaft of the motor-gearhead combination 174, a set of slip-rings 194, and an annular tube 196 which is drivingly connected to the output flange of the harmonic drive 182 and which protrudes above the winding and payout mechanism to provide the manipulator arm rotational means and mounting means. The slip rings 194 are mounted concentric with and outside the annular tube 196 above the harmonic drive and below the cable winder mechanism 14. The annular tube of the turret mechanism 196 is also bearingly supported by the annular tube 74 of the cable winder mechanism.

Figure 8:
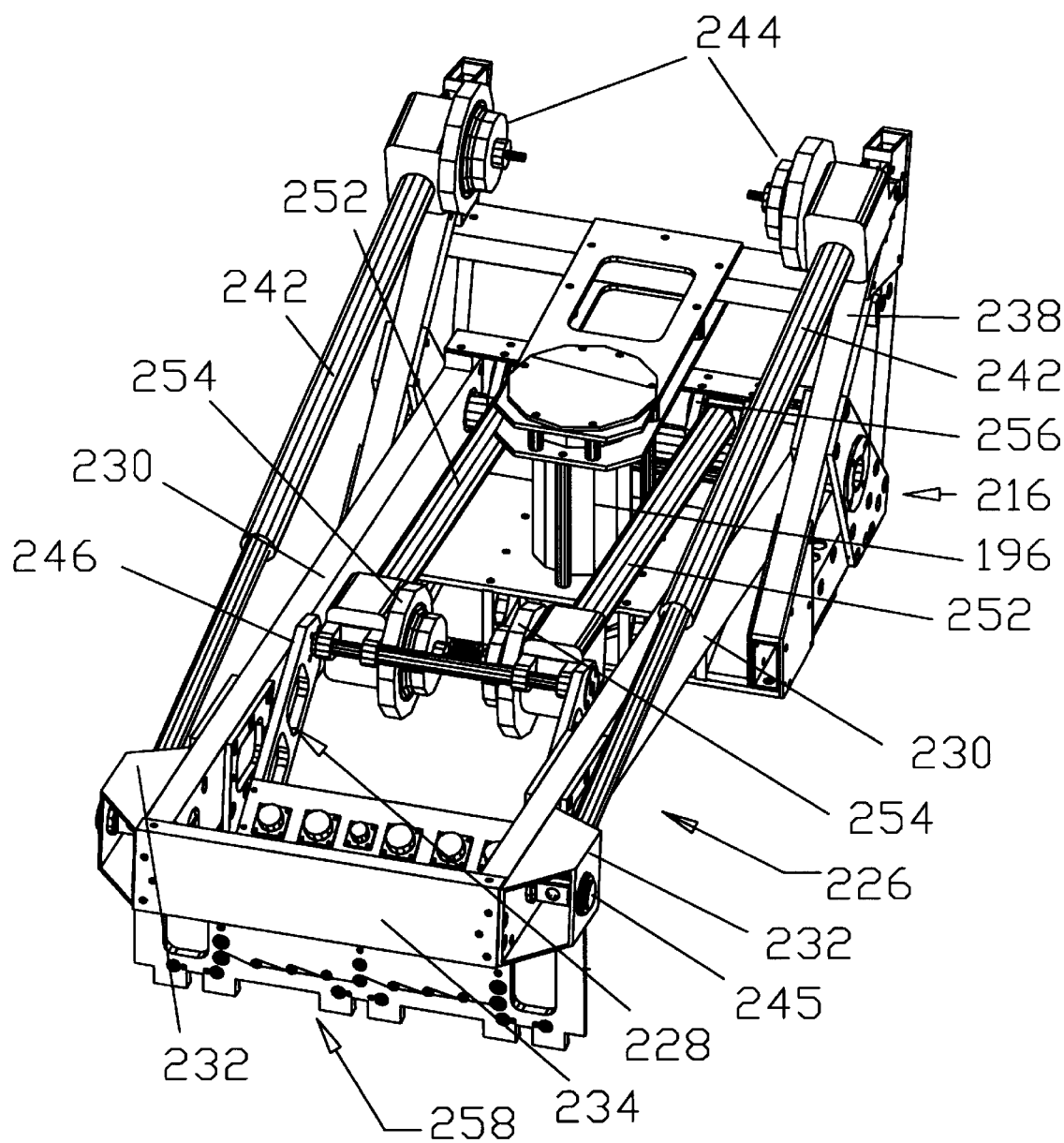
FIG. 8 is a perspective view of the manipulator arm means of the present invention.
Figure 9:
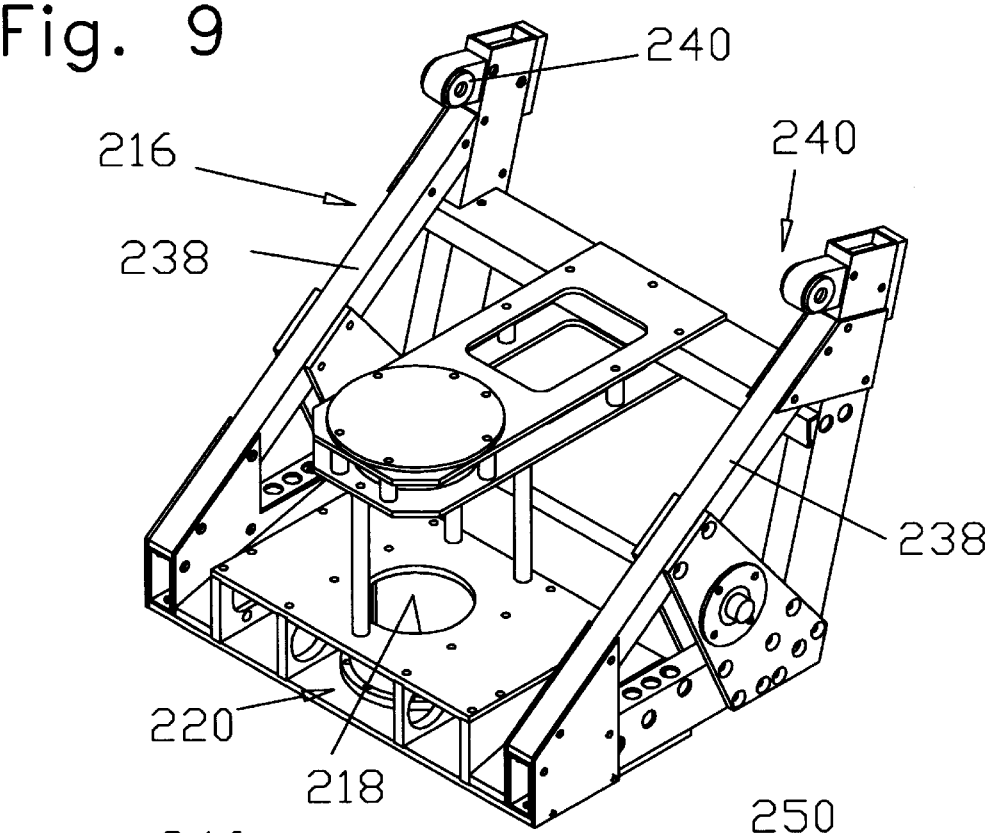
FIG. 9 is a perspective view of the base section of the manipulator arm means of the present invention.
Figure 10:
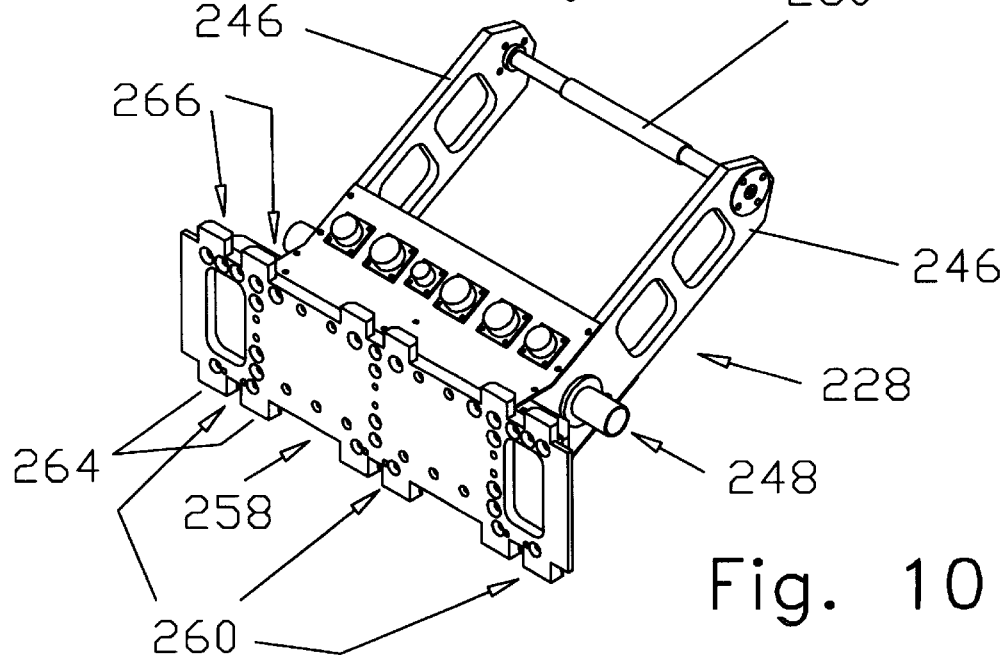
FIG. 10 is a perspective view of the second arm section of the manipulator arm means of the present invention.

FIGS. 8, 9 and 10 illustrate the basic manipulator arm means 18. It includes a base section 216 that has a circular opening 218 (FIG. 9) at the forward end thereof, which opening receives the turret annular tube 196. An adjustable clamp 220 which is fixed to the base section 216 clamps around the turret annular tube thereby fixing the base section and the tube together. The base section 216 extends horizontally away from the upper end of the turret annular tube and provides a platform to which other components of the manipulator arm are attached.

The basic manipulator arm means 18 includes first 226 and second 228 arms, each of which is independently driven for pivotal movement about appropriate axes as will hereinafter be described. The first arm 226 includes a pair of spaced apart beam members 230 pivotally connected at the proximal end thereof to the base section 216. The beam members are parallel and at the distal end thereof they are provided with short tube sections 232 which are attached thereto. A cross brace 234 imparts rigidity and strength to the first arm 226. A pair of generally triangular brackets 238 at the rear of the base section pivotably support, as at 240, the power ends of a pair of extendable and retractable linear actuators 242, driven each by a drive motor 244 that is preferably electrical but could be pneumatic or hydraulic. The opposite end of each linear actuator is connected to a rotatable rod 245 that extends inside the tube sections 232. The linear actuators 242 and the arm 226 are designed so that the arm 226 can pivot vertically through an arc of about 110°, from generally vertical to about 20° below horizontal.

The second arm 228 is much shorter than the first arm, includes a pair of parallel angled beam members 246 and is pivotally connected to the first arm 226 at the distal end of the beam members 230 by way of a transverse pivot rod 248. At the proximal end of the arm 228 there is a transverse rod 250 which mounts the proximal end of a pair of linear actuators 252, each powered by a drive motor 254. The distal end of each linear actuator is pivotally connected to a bracket 256 which is fixed to the adjacent beam member 230 at the proximal end thereof. Under operation of the linear actuators 252 the second arm 228 can pivot through an arc of about 120° relative to the first arm 226.

At the distal end of the second arm there is a bulkhead 258 which carries thereon or has integrally formed therewith a plurality, such as three, of quick-connect and disconnect mechanisms 260. The quick-connect and disconnect mechanisms 260 include mechanical portions and appropriate electrical portions. The quick-connect and disconnect mechanisms are adapted to receive any one, or a combination, of fixed length links 270, 272, 274 (FIG. 11), extendable links 20 (FIG. 12), a wrist and gripper mechanism (FIG. 14), and/or an aiming and disrupter device (FIG. 15). As can be seen in FIG. 10 the mechanical quick-connect and disconnect mechanism on the bulkhead 258 involves a pair of upstanding, transversely spaced lugs 266 along the upper edge of the bulkhead and corresponding transversely spaced lugs 264 along the bottom edge of the bulkhead, and a latching clamp member 268 adjacent the lower edge thereof, which is retracted (and therefore not shown) in FIGS. 8 and 10, but which is shown in position in FIGS. 11, 12 and 13.

Figure 11:
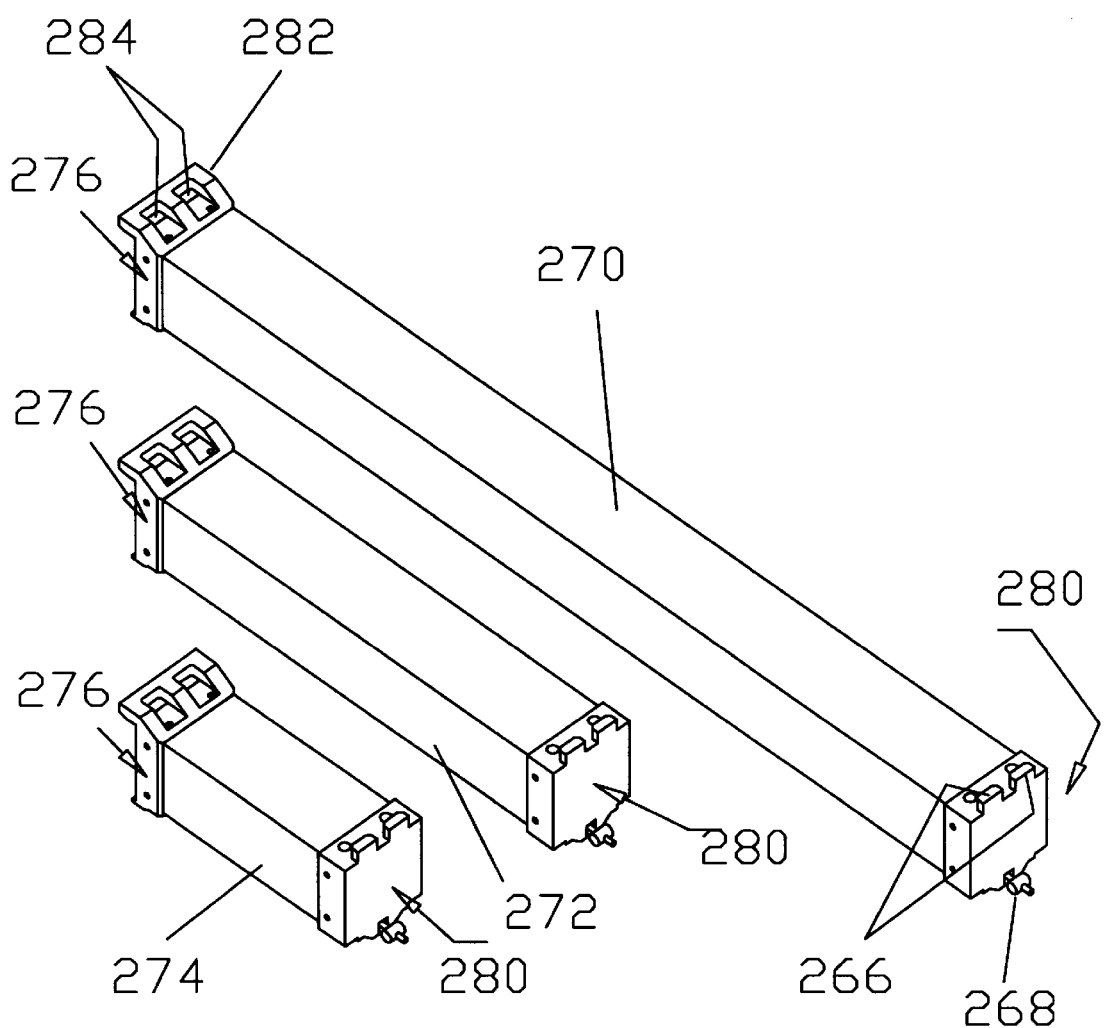
FIG. 11 is a perspective view of several link members which can be attached to the manipulator arm means.

The fixed length links are shown in FIG. 11, each of the links 270, 272, 274 being identical except for the length thereof. Each link is formed from generally square tubing and hence is hollow along the length thereof. At the proximal end thereof each link has a quick-connect and disconnect mechanism 276 adapted to cooperate with any of the corresponding mechanisms 260 on the bulkhead 258 or with a quick-connect and disconnect mechanism 280 found at the distal end of each of the fixed links, the mechanisms 280 being identical to the mechanisms 260. Each quick-connect and disconnect mechanism 276 includes a flange 282 extending rearwardly from the upper edge of the link and has a pair of transversely spaced apart openings 284 each of which is adapted to receive a corresponding lug 266, and a split lug (not shown) similar to spaced lugs 264 extending downwardly from adjacent the bottom edge of the link and adapted to be engaged by the latching clamp 268. When a link is hung on the bulkhead by way of the interengaging lugs 266 and openings 284 the split lug will be engaged by the latching clamp 268 to help hold the link in place.

Figure 12:
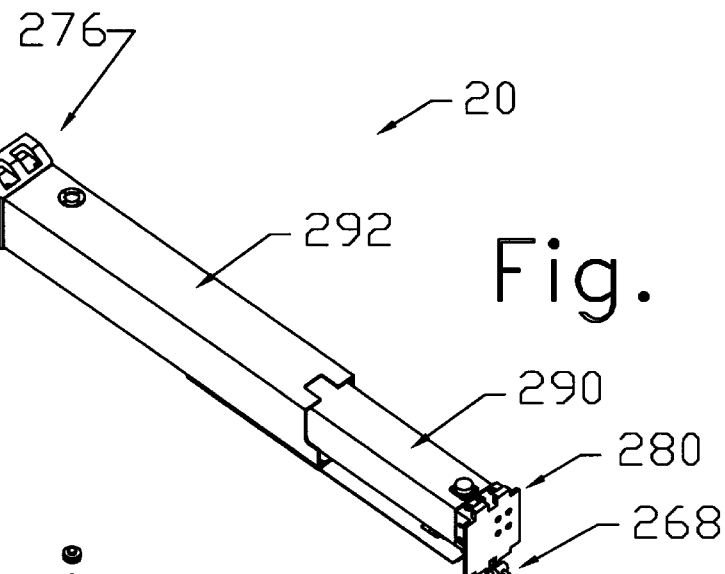
FIG. 12 is a perspective view of an extendable link which can be attached to the manipulator arms means or to one of the link members of FIG. 11.
Figure 13:
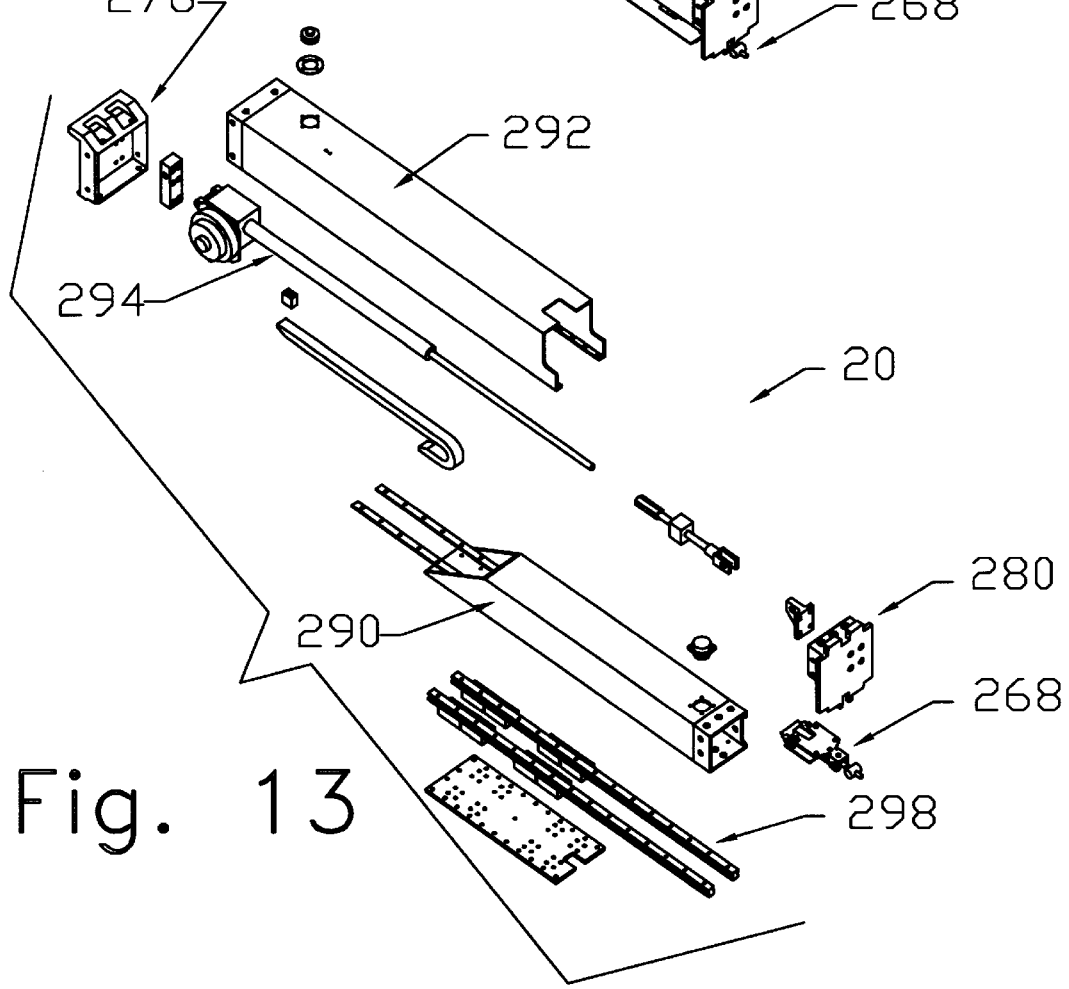
FIG. 13 is an exploded perspective view of an extendable link which can be attached to the manipulator arm means or to one of the link members.

FIGS. 12 and 13 illustrate a linear extension link 20 of the invention. This link comprises inner 290 and outer 292 hollow telescopic members. A linear actuator 294 contained within the extension link provides controlled extension and/or retraction of the inner member 290 relative to the outer member 292. The actuator is anchored at its proximal end to the proximal end of the outer member. The distal end of the actuator is anchored to the distal end of the inner member 290. At the proximal end of the outer member is a quick-connect and disconnect mechanism 276 identical to that provided at the proximal end of each of the fixed links as described above. At the distal end of the inner member there is a quick-connect and disconnect mechanism 280 identical to that provided at the distal end of each of the fixed links. It will be obvious that the extension link 20 can be attached to any of the quick-connect and disconnect mechanisms 260 on the bulkhead 258 or to any of the quick-connect and disconnect mechanisms 280 at the end of a fixed link.

The linear extension link 20 is designed to carry a payload of about 50 kg at its full extension of about 300 mm, to exert a pull or push force of about 1500 N along the length thereof, and to resist a side force of 500 N at full extension. The drive motor therefor will move the inner member at a no load speed of about 15 mm/s.

As indicated above, linear movement of the inner member is achieved by a linear actuator 294. The inner member is supported within the outer member on linear rail bearings 298. Because the link is hollow, cabling for effectors to be attached to the distal end thereof can be contained within the link, so that the cabling is not exposed to the atmosphere or to mechanical elements that could cause damage.

Figure 14:
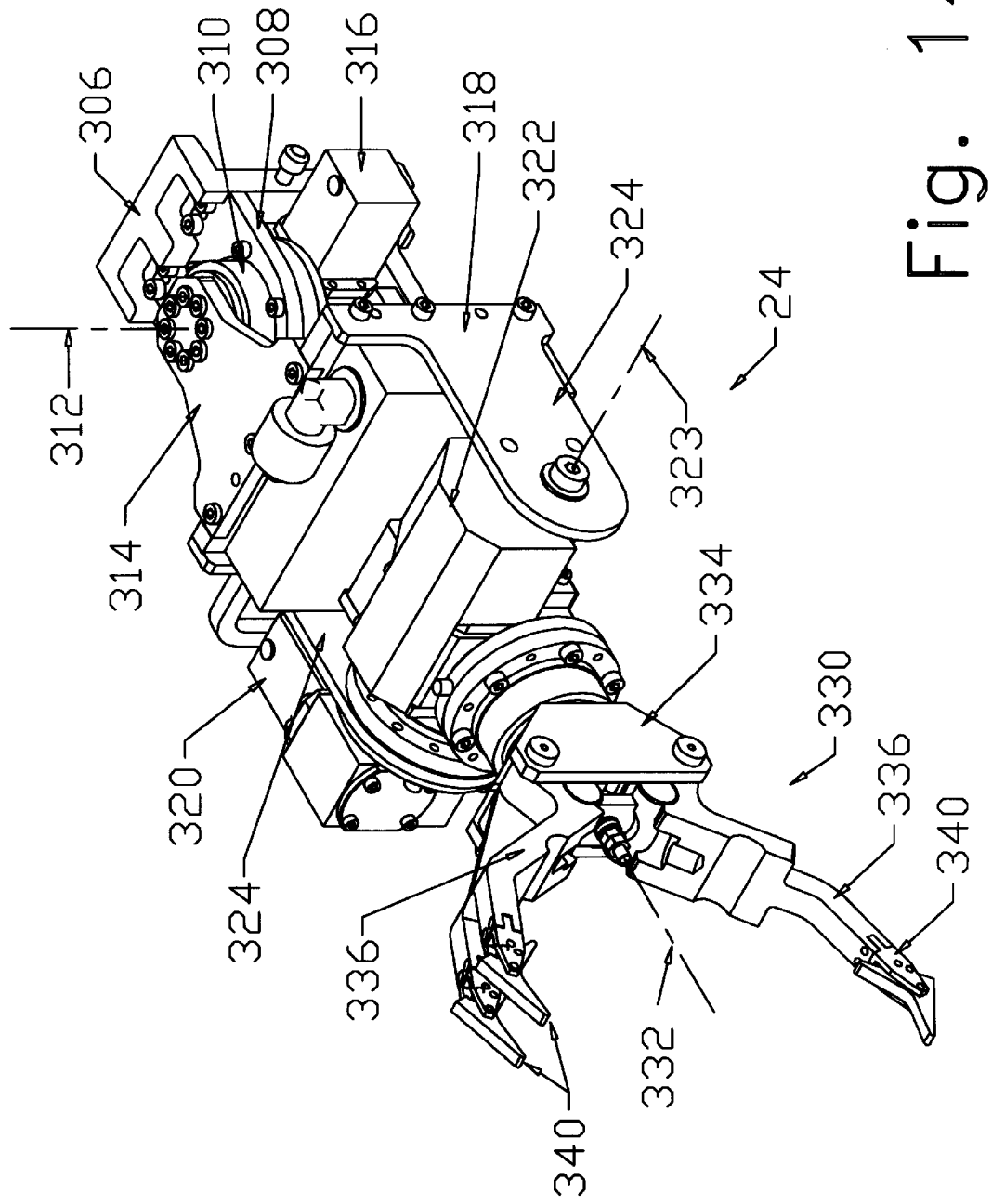
FIG. 14 is a perspective view of a wrist and gripper mechanism which can be attached to the manipulator arm means or to one of the link members or to an extendable link.
Figure 15:
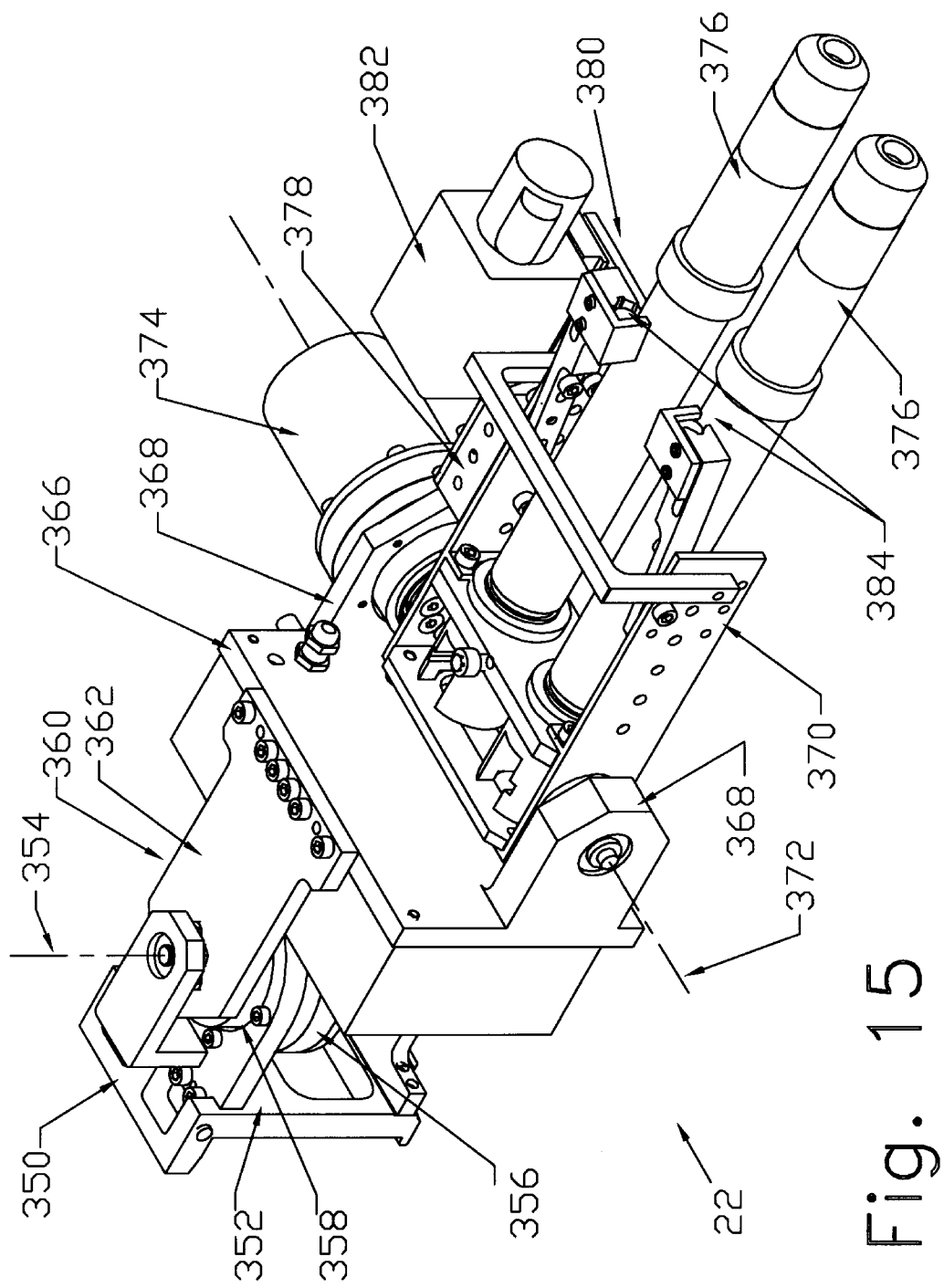
FIG. 15 is a perspective view of an aiming and disruptor attachment which can be attached to the manipulator arm means or to one of the link members or to an extendable link.

FIG. 14 illustrates in perspective the wrist and gripper mechanism 24 utilized with this invention. The mechanism 24 includes at its proximal end a quick connect and disconnect mechanism 306 similar to the mechanism 276 so that the wrist and gripper mechanism may be directly connected to the bulkhead 258 of the manipulator arm 18 or to the available distal end of a fixed length link or to the distal end of an extendable link as seen in FIG. 1. The wrist and gripper mechanism has a frame member 308 with a journal 310 defining a vertical yaw axis 312. A first yoke 314 is pivotally connected to the journal 310 and a suitable drive or servomotor 316 is provided to effect desired rotation of the yoke about the axis 312.

A second yoke 318 fixed to the first yoke opens outwardly therefrom and carries the bulk of the operating components of the wrist and gripper mechanism. In particular it carries a servomotor 320 adapted to rotate an axle member 322 which extends across the yoke between the arms 324 thereof defining a pitch axis 323. One of the arms 324 carries another servomotor drivingly connected to an axle for rotating the jaw assembly 330 on the roll axis 332. The jaw assembly includes a frame member 334, a pair of pivoting jaws 336, a motor for opening and closing the jaw members 336, and a replaceable gripper 340 at the distal end of each jaw member 336. The grippers 340 may be selected as appropriate for secure gripping of whatever object needs to be held and transported by the robot, whether the object be cylindrical, rectilinear, or of an irregular shape. The grippers as shown in FIG. 14 would be particularly adapted for gripping a cylindrical object.

FIG. 15 illustrates the aiming and disrupter mechanism 22 for this invention. The mechanism includes a rearmost vertical flange 350 which has a quick connect and disconnect mechanism similar to those previously described whereby the mechanism 22 can be attached to the bulkhead 258 or to the distal end of a fixed length link or to the distal end of an extendable link. The flange 350 is in turn secured to upper and lower plates of a yoke 352 which define a generally vertical yaw axis 354 therebetween. Positioned within the yoke 352 and secured to one of the plates thereof is a servomotor 356 which is adapted to drive, through a suitable gearset 358, a second yoke 360 which can pivot or rotate on the yaw axis 354.

The second yoke 360 incldues an upper plate 362 and a lower plate, both being secured to a vertical plate 366, the upper and lower plates being appropriately journaled for rotation on the axis 354, with the upper plate being attached to the gearset 358 for rotation therewith, as driven by the motor 356. A pair of vertical plates 368 connected to the vertical plate 366 and extending normal thereto mount therebetween the aiming and disrupter apparatus of this attachment.

Extending between the plates 368 at a forward end thereof is a frame or bracket member 370, journaled at a proximal end to the respective plate 368 for rotation on pitch axis 372. Adjacent one of the plates 368 is a servomotor 374 adapted to impart rotation to the bracket 370 on the pitch axis 372. The bracket 370 carries a pair of spaced apart disruptors 376, such as commercially available single shot water cannons, which can project a charge of water at high velocity and high pressure against a designated target.

The bracket 370 can also accept further mounting means 378 which includes a sideways extending bracket 380 for attachment thereto of a video camera 382 and/or a targeting laser 384. The aiming and disrupter mechanism 22 is adapted for controlled pivotal movement in yaw and pitch, with the video camera 382 transmitting to the operator close-up views of a potential target, the water disruptors being aligned with the camera so that the target visualized by the camera is the target that can be impacted by a water charge discharged from one or both of the water cannons 376. The laser could be used to achieve more precision targeting as the operator would be able to place the laser spot exactly on the target to be impacted.

Figure 16:
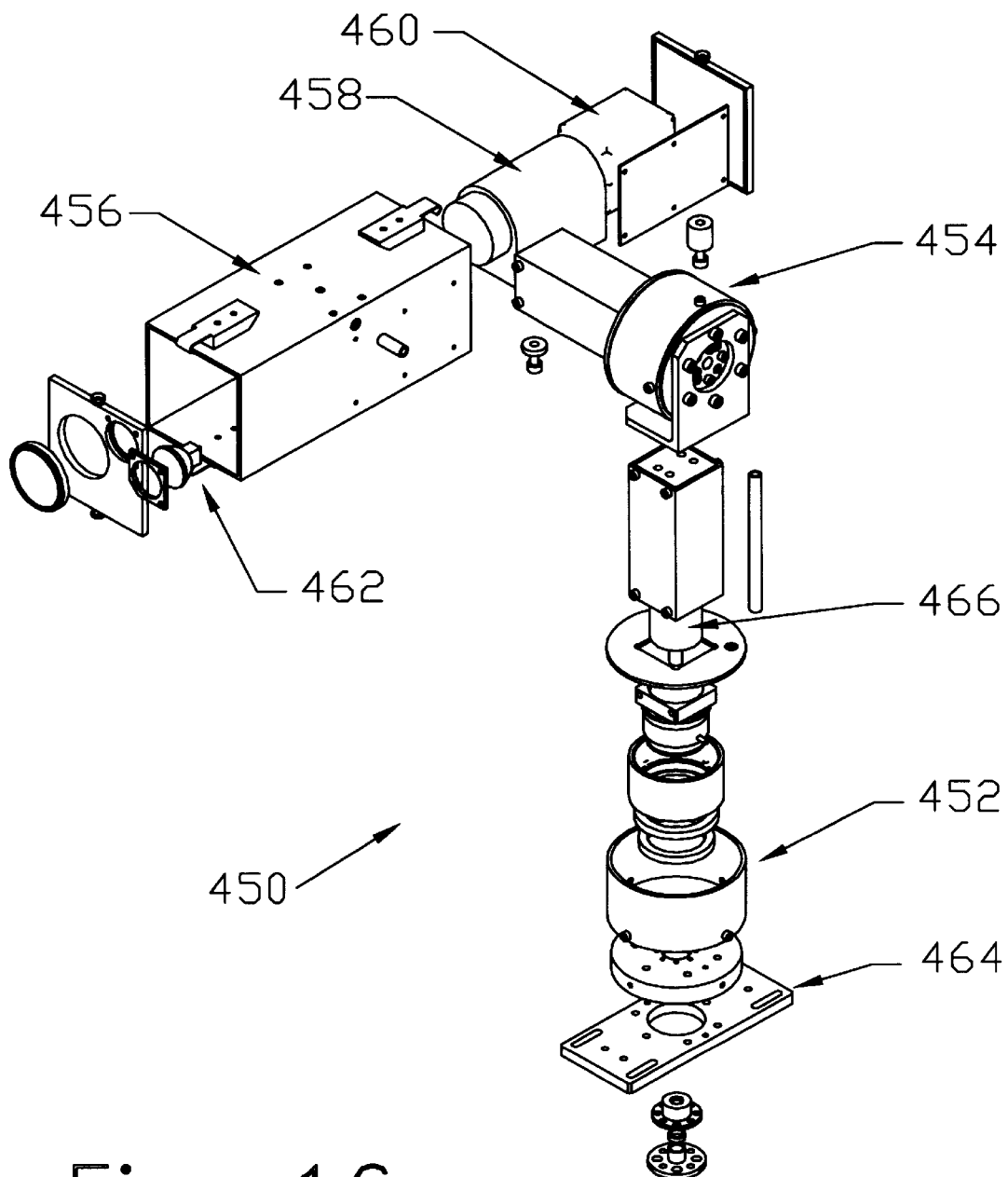
FIG. 16 is a partial exploded perspective view of relocatable surveillance camera mechanism that can be mounted to the manipulator arm means or to one of the link members or to an extendable link.

FIG. 16 illustrates the surveillance camera mechanism 450 for this invention. The surveillance camera includes a quick-connect and disconnect relocatable mount 464, a 355° yaw joint 452 mounting a motor and gearhead combination 454, connected to the relocatable mount, a 355° pitch joint with motor and gearhead (not shown) connected to the yaw joint 452, a commercially available color camera 460, a commercially available zoom lens 458, a light 462, a microphone (not shown), and a housing 456 enclosing the camera, zoom lens, light, microphone, and associated electronics. With the yaw and pitch capabilities the camera is capable of looking in all directions from its mounted position on the robot. The camera is offset from both the yaw and pitch axis so that the camera also has the ability to view the same target from two different positions, thereby allowing the camera to be useful even if one view is blocked by an obstacle. The zoom and focus features allow the operator to quickly and easily survey different targets from a distance to ascertain their nature. The quick connect and disconnect relocatable mount uses straps (not shown) to secure the surveillance camera to any part of the robot such as the links 270, 272, 274, the extension 20, or the manipulator arm 18. This versatility allows the camera to be used for such functions as looking underneath or on top of a car, truck, or other vehicle, looking into a second storey window of a building, providing a clear view of a local area from a point 4 meters in the air, looking on top of single storey building or shed, allowing minimal exposure of the robot by being mounted on the links 3 meters in front of the robot, thereby, for example, only having the surveillance camera inside a hazardous room and the rest of the robot safely on the outside.

Control of the robot and its functions is effected electronically. As seen in FIG. 2 the base section includes a control module 390 which includes microprocessor means for accepting input from a control panel 392 connected to a short cable 394 which in turn is connected to the base station 396 (FIG. 1), which in turn is connected via coaxial cable 72 to the robot. The control module 390 can accept instructions from a remote control station 396 connected to the free end of the control cable 72, such that the robot can be controlled from a great distance, thereby avoiding exposure of the operator to conditions dangerous to his health and well-being. The control panel 392 can also be attached via a short cable (not shown) to the robot. This allows the robot to be controlled by an operator who walks beside or behind the robot. The winding and payout mechanism 14 prevents any fouling of the control cable as the robot moves towards or away from the operator and as the end effectors thereon are moved towards or away from a target. Cables extend from the control module 390 to the various items requiring control, namely the linear actuators for the first and second arms, the turret mechanism, the winding and payout mechanism, the extendable link (if utilized), the wrist and gripper mechanism, the aiming and disruptor attachment, and any other attachments, such as video cameras, that might be attached to the robot. The operator's control station will include joysticks and any other switching means needed to effect remote control of the functions of the robot. As indicated previously, the bulkhead 258 and the various links connectable thereto will include appropriate, commercially available electric quick connect and disconnect means so that electric control signals can reach the effector to be controlled.

The foregoing has described the robot of the present invention in some detail. It is realized that, a skilled person in the art could deviate from the exact structure as described herein without departing from the spirit of the invention. Accordingly the protection to be afforded this invention is to be determined from the claims appended hereto.

What is claimed is:

1. A robot especially adapted to handle hazardous material comprising:

a) a wheeled base section carrying self-contained power means for the robot, said base section having a planar upper surface;

b) a winding and payout mechanism rotatably mounted to said base section, said winding and payout mechanism containing a length of control cable, being freely rotatable through more than 360° and including spool means rotatably and bearingly mounted to a first annular tube extending vertically of said base section, drive means for imparting rotating movement to said spool means, and arm means extending generally tangentially of said spool means for holding said control cable at a distance from said base section and carrying guide means for guiding said control cable to and from said spool means, c) a turret mechanism coaxial with said winding and payout mechanism and including a rotatable portion above said winding and payout mechanism;

d) manipulator arm means mounted to said rotatable portion of said turret mechanism, said arm means including a base portion, a first arm pivotable at a proximal end thereof to said base portion, and a second arm pivotable between a proximal end thereof and a distal end thereof to said first arm adjacent a distal end thereof;

e) actuating means for moving said first arm relative to said base portion and for moving said second arm relative to said first arm;

f) quick connect and disconnect means at the distal end of said second arm and adapted to accept one or more of a plurality of attachments especially adapted to perform a variety of functions;

g) said plurality of attachments including a plurality of link sections of different lengths, telescopic extension link means, a wrist and gripper mechanism, and an aiming and disruptor mechanism;

h) said wrist and gripper mechanism being movable in yaw, pitch and roll, and including at least a pair of openable and closable gripper jaws, said wrist and gripper mechanism also being selectively connectable to a distal end of any one of said link sections and to a distal end of said telescopic link;

i) control means connected to said control cable for selectively controlling the movement of said base section, said rotatable turret portion, said manipulator arm means, and said attachments; and j) a surveillance camera mechanism including yaw, pitch, zoom and focus capabilities, said camera mechanism being selectively connectable to said manipulator arm means, to any one of said link sections, to said telescopic link or to said aiming and disruptor mechanism.

2. The robot of claim 1 wherein said power means includes battery means and said base section houses said battery means and motor means connected to said battery means, and said base section mounts at least three support wheels spaced apart along each side of said base section, one pair of opposed wheels being drivingly connected to said motor means and the remaining wheels being drivingly connected to said one pair of wheels.

3. The robot of claim 2 including first and second sets of flexible track means for mounting to the wheels of said base section on each side thereof, said first set of tracks being narrower than said second set of tracks so that the overall width of a tracked robot carrying said first set of tracks is less than the width of a standard door opening.

4. The robot and track means of claim 3 including removable skids which attach to said base section and interface with the tracks in such a way as to provide an approximately linear surface for the tracks which enhance the stair climbing capability of said robot.

5. the robot of claim 2 including a pair of said battery operated motors, and a two-speed transmission drivingly connected to each said motor and to one of said one pair of opposed wheels.

6. The robot of claim 5 wherein said two-speed transmission includes gears for two different speed ratios which are selected remotely by said control means, and are switched by means of a small electric motor and actuator.

7. The robot of claim 1 wherein electrical slip ring means are fixed between and to said first annular tube and said spool means, one end of said control cable being connected to said slip ring means as are said control means, whereby control signals may pass from said control cable to said control means through said slip ring means.

8. The robot of claim 7 wherein said drive means includes a drive motor, a first spur gear connected to a shaft of said drive motor, and a second spur gear meshingly engaged with said first spur gear, said second spur gear extending through an opening in said first annular tube and meshingly engaging an internal spur gear connected to said spool means.

9. The robot of claim 8 wherein said guide means includes: a pulley arrangement adjacent a distal end of said arm means, said pulley arrangement containing a pair of guide rollers through which said control cable passes; and a housing depending from said distal end of said arm means, said housing containing an adjustable potentiometer and an elongated arm extending downwardly therefrom, said elongated arm carrying bushing means through which said control cable can pass.

10. The robot of claim 1 wherein said turret mechanism includes a second annular tube bearingly supported by said robot base section, a drive train drivingly attached to said second annular tube, a plate rigidly supporting said drive train relative to said robot base section, and a drive motor for imparting rotary movement thereto.

11. The robot of claim 10 wherein said drive train includes a brake connected to said last-mentioned drive motor, a gearhead connected to said last-mentioned drive motor, and a harmonic drive connected to said gearhead, the output shaft being said second annular tube.

12. The robot of claim 10 wherein: said manipulator arm means base portion is secured to said second annular tube for rotation therewith; said actuating means includes a first pair of linear actuators connected between said base portion and the distal end of said first arm to impart pivotal movement to said first arm, and a second pair of linear actuators connected between the proximal end of said first arm and the proximal end of said second arm to impart pivotal movement to said second arm relative to said first arm; and a bulkhead is provided at said distal end of said second arm, said quick connect and disconnect means being part of said bulkhead.

13. The robot of claim 12 wherein each of said link sections includes quick connect and disconnect means at each end thereof to facilitate attachment thereof to said bulkhead or to said extension link and to facilitate attachment thereto of said wrist and gripper mechanism, said extension link, or said aiming and disruptor mechanism.

14. The robot of claim 12 wherein said extension link includes outer and inner telescopic members, a linear actuator within said extension link connected at one end thereof to a proximal end of said outer telescopic member and at the other end thereof to a distal end of said inner telescopic member, linear rail bearings supporting said inner telescopic for linear movement within said outer telescopic member, and quick connect and disconnect means at the proximal end of said outer telescopic member and at the distal end of said inner telescopic member to facilitate attachment of said extension link to said bulkhead, or to one of said link sections and to facilitate attachment to said extension link of said wrist and gripper mechanism or said aiming and disrupter mechanism.

15. The robot of claim 1 wherein said wrist and gripper mechanism includes: a frame carrying a quick connect and disconnect mechanism for attachment to a bulkhead at said distal end of said second arm, to one of said link sections, or to said extension link; a first yoke rotatably connected to said frame for driven rotation about a vertical yaw axis; a second yoke connected to said first yoke and including a pair of spaced apart arm members; and a jaw assembly located between said arm members and mounted for driven rotation on a horizontal pitch axis extending transversely of said second yoke, said jaw assembly also being mounted for driven rotation on a roll axis, said jaw assembly including a pair of opposed pivotable and/or translational jaw members and a replaceable gripper member at a distal end of each said jaw member.

16. The robot of claim 11 wherein said aiming and disruptor mechanism includes: a flange carrying a quick connect and disconnect mechanism for attachment to a bulkhead at said distal end of said second arm, to one of said link sections, or to said extension link; a first yoke integral with said flange and defining a vertical yaw axis; a second yoke rotatably connected to said first yoke for driven rotation on said yaw axis; a pair of spaced apart plates extending from said second yoke and mounting therebetween on a pitch axis a bracket member for driven rotation on said pitch axis; a pair of water cannon members mounted to said bracket member; and means on said bracket member for attachment thereto of aiming or targeting means.

17. The robot of claim 16 wherein said aiming and disruptor mechanism includes a first servomotor within said first yoke drivingly connected to said second yoke for imparting rotational movement thereto on said yaw axis; and a second servomotor connected to one of said plates and to said bracket member for imparting rotational movement thereto on said pitch axis.

18. The robot of claim 16 wherein said aiming or targeting means comprises a video camera, a laser, or a video camera and a laser in combination.

19. The wrist and gripper mechanism of claim 15 including a first servomotor for imparting rotational movement to said first yoke on said yaw axis; an axle extending transversely of said second yoke on said pitch axis and mounting said jaw assembly thereto, there being a second servomotor for imparting rotational movement to said jaw assembly on said pitch axis; and a third servomotor for imparting rotational movement to said jaw assembly on said roll axis.

20. The robot of claim 1 wherein said surveillance camera includes: a limited yaw joint of about 355° mobility with a motor and a gearhead connected to a selectively locatable mount, a limited pitch joint of about 355° mobility with a motor and a gearhead connected to the yaw joint, a commercially available color camera, a commercially available zoom lens, a light, a microphone, and a housing enclosing the camera, zoom lens, light, microphone, and associated electronics.

* * * * *